R. MANSFIELD.
WHEEL SCRAPING IMPLEMENT.
APPLICATION FILED NOV. 26, 1910.
993,087.
Patented May 23, 1911.
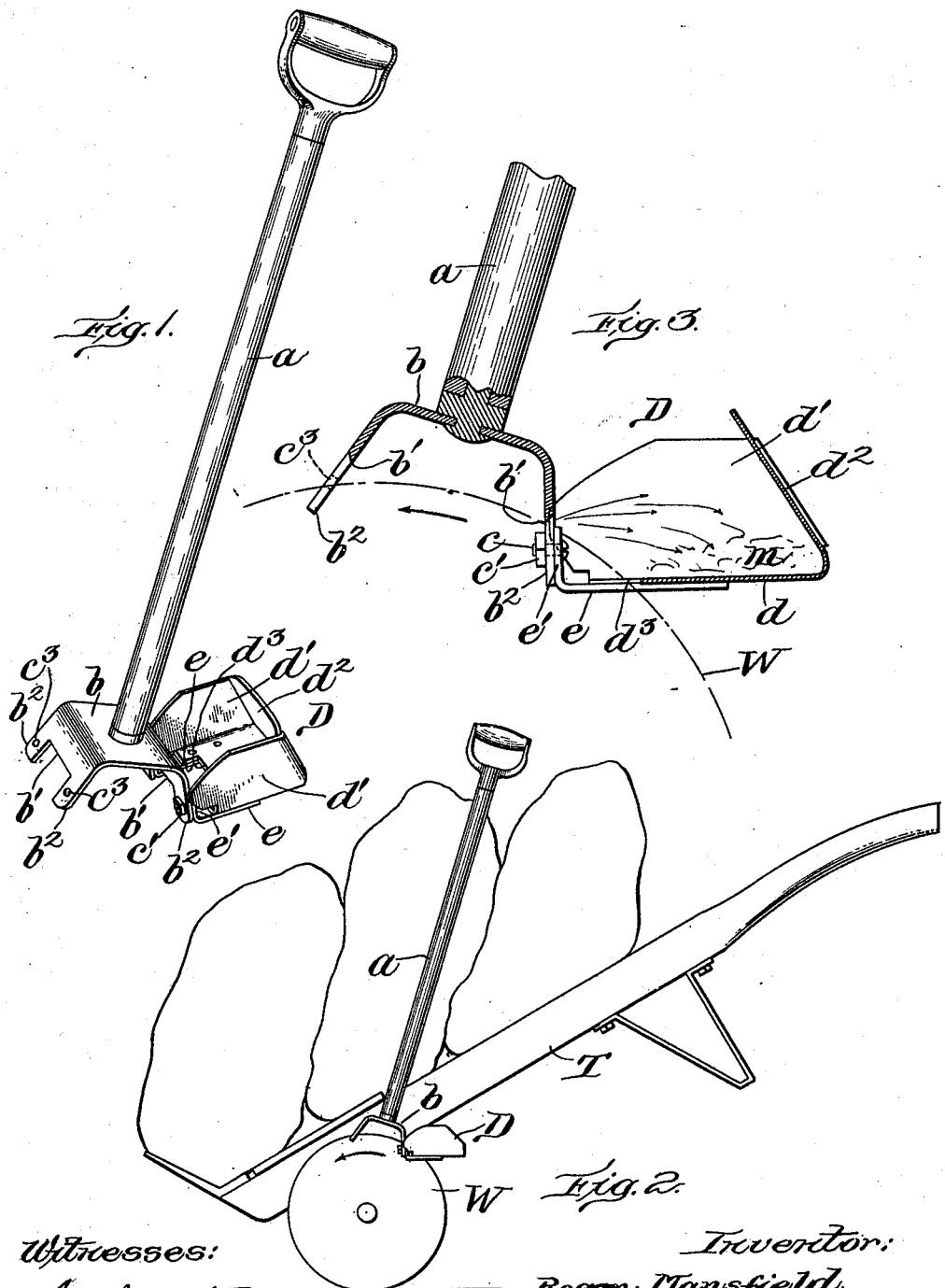

UNITED STATES PATENT OFFICE.

ROGER MANSFIELD, OF BOSTON, MASSACHUSETTS.

WHEEL-SCRAPING IMPLEMENT.

993,087.

Specification of Letters Patent. Patented May 23, 1911.

Application filed November 25, 1910. Serial No. 594,036.

*To all whom it may concern:*

Be it known that I, ROGER MANSFIELD, a citizen of the United States, and resident of Boston, in the county of Suffolk and State of Massachusetts, have invented new and useful Improvements in Wheel-Scraping Implements, of which the following is a specification.

This invention relates to wheel scraping implements, and its object is to provide an effective and convenient tool or implement which will both remove material from a wheel, and also catch and hold the material so removed for suitable disposal, instead of permitting it to fall upon the ground. As the device is especially useful in connection with the wheels of trucks, I will describe an embodiment of the invention for such use, and will illustrate its operation in connection with truck wheels, though it is of course applicable to wheels generally.

In such places as sugar refineries, warehouses and wharves, where large quantities of sugar are being handled, and truck loads of material are being wheeled about, considerable quantities of the sugar become scattered on the floor, and adhere to the truck wheels. It is necessary frequently to clean the wheels of the adhering material, which has hitherto been done by means of crude tools, which neither scrape the wheels effectively, nor collect the material scraped from the wheels but allow it to fall upon the floor, whence it must be again gathered up, thus requiring further labor and handling, or if it is allowed to remain is again picked up by the wheels as the trucks are rolled over the floor.

The object of the present invention is to provide an implement for conveniently and thoroughly stripping the adhering material from the wheels and at the same time collecting the material so stripped from the wheels.

Obviously, the invention is applicable to the cleaning or stripping of any material which may be picked up and become caked or stuck on a wheel, but its chief utility I believe is in conditions such as those which prevail in a sugar refinery, and I will therefore address my description to an embodiment of the invention applicable to such use.

In the accompanying drawings, which illustrate one embodiment of my invention,—Figure 1 is a perspective view of an implement embodying my invention; Fig. 2 is a vertical central section of the implement, enlarged; and Fig. 3 is a side view, showing the use of the implement in connection with a truck.

Referring to the drawings,—$a$ represents the handle of the implement, by which it is held and manipulated. At the lower end of the handle $a$ is secured the implement proper, comprising the bridge portion $b$, at each end of which is the downwardly facing transverse blade $b'$, preferably made integral with the bridge portion, and provided at each end with a downwardly extending horn or guide $b^2$. Secured to one of the blades $b'$, by means of nuts $c'$ and bolts $c$, passing through holes $c^3$ in the horns $b^2$, is a receptacle D to receive the material scraped from the wheel. This receptacle, as herein shown, consists of a box-like structure made up of a bottom $d$, side walls $d'$, and an end wall $d^2$. The side walls $d'$ preferably extend forward to the ends of the blade, thus closing the sides, and the bottom is cut away as shown at $d^3$ to form a wheel aperture. The receptacle is detachably secured to the blade by brackets $e$, which are fastened to the under side of the receptacle, upturned at their forward ends as shown at $e'$ and secured to the horns $b^2$ by said bolts $c$. The receptacle is not only detachable, but is also reversible, that is, it may be turned end for end and secured to the opposite blade $b'$, so that when one blade $b'$ becomes dull, the receptacle may be reversed and the other blade used. When both blades become dull the receptacle may be removed and both blades sharpened.

In use the implement is held with the blade nearest the receptacle pressed against the tread or periphery of the wheel W, which rotates through the wheel aperture $d^3$ in the bottom of the receptacle. The horns $b^2$ on the blade which for the time being is the operative blade extend over the margins of the sides of the wheels, and act both as guides to hold the blade $b'$ from slipping off the sides of the wheel, and as scrapers along their inner edges to remove any material which may adhere to the wheel along its margins on either side. The forward or opposite horns $b^2$ may be held, as shown, extending a little over the margin of the wheel to hold the implement against any tendency to twist in the hands of the user. As the truck T moves forward, and the wheel W rotates in the direction of the arrow, the rear blade b' scrapes any adhering material from the periphery of the wheel, and such material drops into the receptacle and is there collected as shown at m, and may be saved or disposed of in such manner as is desired.

I claim:

1. A wheel scraping implement comprising a handle, a transverse blade, and a receptacle provided with a wheel aperture in its bottom adjacent to said blade, said wheel aperture adapted to admit the entrance of the rim of a wheel into the receptacle and into engagement with the blade, and said blade and receptacle being carried by said handle.

2. A wheel scraping implement comprising a handle, a transverse blade, and a receptacle secured directly to the blade at the side thereof, said receptacle being provided with a wheel aperture in its bottom adjacent to said blade adapted to admit the entrance of the rim of a wheel into the receptacle and into engagement with the blade, and said blade and receptacle being carried by said handle.

3. A wheel scraping implement comprising a handle, a transverse blade, a guide at each end of the blade adapted to project over the margin of the wheel to hold the implement in position laterally with relation to the wheel, and a receptacle provided with a wheel aperture in its bottom adjacent to the blade, said wheel aperture adapted to admit the entrance of the rim of a wheel into the receptacle and into engagement with the blade, and said blade, guides and receptacle being carried by said handle.

4. A wheel scraping implement, comprising a handle, a bridge portion secured to said handle, a downwardly extending transverse blade at each end of said bridge portion, and a reversible receptacle adapted to be detachably secured to either blade.

5. A wheel scraping implement comprising a handle, a transverse blade made with an integral downwardly extending horn at each end, and a receptacle secured to the side of the blade provided with a wheel aperture in its bottom adjacent to the blade, said wheel aperture adapted to admit the entrance of the rim of a wheel into the receptacle and into engagement with the blade, and said blade and receptacle being carried by said handle.

6. A wheel scraping implement, comprising a handle, a bridge portion secured to said handle, a downwardly extending transverse blade at each end of said bridge portion, a pair of guide horns extending downwardly from the ends of each blade, and a reversible receptacle provided with a wheel aperture in its bottom and adapted to be detachably secured to either blade.

Signed by me at Boston, Massachusetts, this 19th day of November, 1910.

ROGER MANSFIELD.

Witnesses:
ROBERT CUSHMAN.
CHARLES D. WOODBERRY.

---

Copies of this patent may be obtained for five cents each, by addressing the "Commissioner of Patents, Washington, D. C."